United States Patent [19]
Ravid

[11] Patent Number: 6,131,141
[45] Date of Patent: Oct. 10, 2000

[54] METHOD OF AND PORTABLE APPARATUS FOR DETERMINING AND UTILIZING TIMING PARAMETERS FOR DIRECT DUPLICATION OF HARD DISK DRIVES

[75] Inventor: Gonen Ravid, Agoura Hills, Calif.

[73] Assignee: Intelligent Computer Solutions, Inc., Chatsworth, Calif.

[21] Appl. No.: 08/749,416

[22] Filed: Nov. 15, 1996

[51] Int. Cl.[7] .................................................. G06F 13/00
[52] U.S. Cl. ........................ 711/112; 711/162; 711/167; 710/21; 710/29; 710/33; 710/58; 710/60; 710/74; 360/15; 369/84; 714/770; 714/820
[58] Field of Search ..................... 711/111, 112, 161, 711/162, 4, 114, 167; 369/84; 395/822; 360/15, 27, 31, 53; 710/20, 21, 25, 29, 31, 33, 58, 60, 62, 74; 714/5, 6, 7, 770, 819, 820

[56] References Cited

U.S. PATENT DOCUMENTS

| | | | |
|---|---|---|---|
| 3,805,284 | 4/1974 | Coon, Jr. et al. ........................ | 360/15 |
| 4,019,176 | 4/1977 | Cour et al. ............................. | 709/251 |
| 4,375,655 | 3/1983 | Korth et al. ............................ | 360/15 |
| 4,494,156 | 1/1985 | Kadison et al. ........................ | 360/48 |
| 4,618,897 | 10/1986 | Johnson et al. ......................... | 360/15 |
| 4,620,279 | 10/1986 | Read et al. ............................ | 710/22 |
| 4,707,750 | 11/1987 | Anderson et al. ...................... | 360/60 |
| 4,727,509 | 2/1988 | Johnson et al. ......................... | 360/15 |
| 4,862,411 | 8/1989 | Dishon et al. .......................... | 711/167 |
| 4,864,431 | 9/1989 | Murase .................................... | 360/15 |
| 4,866,601 | 9/1989 | DuLac et al. ........................... | 711/111 |
| 4,907,105 | 3/1990 | Kurzweil, Jr. ......................... | 360/73.02 |
| 5,058,004 | 10/1991 | Ravid .................................... | 710/2 |
| 5,167,020 | 11/1992 | Kahn et al. ............................ | 711/119 |
| 5,235,683 | 8/1993 | Dahlerud ................................. | 710/21 |
| 5,237,466 | 8/1993 | Glaser et al. .......................... | 360/73.03 |
| 5,241,526 | 8/1993 | Ishii ....................................... | 369/124 |
| 5,386,566 | 1/1995 | Hamanaka et al. ..................... | 709/300 |
| 5,610,893 | 3/1997 | Soga et al. ............................. | 369/84 |
| 5,636,359 | 6/1997 | Beardsley et al. ..................... | 711/122 |
| 5,777,811 | 7/1998 | Bodo ...................................... | 360/15 |
| 5,898,841 | 4/1999 | Higgins .................................. | 709/236 |

*Primary Examiner*—B. James Peikari
*Attorney, Agent, or Firm*—Thomas I. Rozsa; Tony D. Chen; Jerry Fong

[57] ABSTRACT

A method of and an apparatus for duplicating direct access storage devices (DASDs) such as hard disk drives (HDDs). The apparatus includes a portable HDD duplicator which can be connected to an existing personal computer (PC), and perform fast data duplication directly from a source HDD to a multiplicity of target HDDs simultaneously. The method includes the steps of providing direct data paths between the source HDD and the target HDDs and performing high speed data duplication and comparison functions by reading the source HDD and writing to the target HDDs at the same time.

58 Claims, 4 Drawing Sheets

METHOD OF AND PORTABLE APPARATUS FOR DETERMINING AND UTILIZING TIMING PARAMETERS FOR DIRECT DUPLICATION OF HARD DISK DRIVES

BACKGROUND OF THE INVENTION

1. Field of the Invention

The present invention generally relates to the technical field of duplicating direct access storage devices. More particularly, the present invention relates to a method of duplicating hard disk drives used in personal computers and an apparatus for duplicating hard disk drives used in personal computers.

2. Description of the Prior Art

In recent years there has been a dramatic increase in the size of operating systems and application programs for personal computers (PCs). This has resulted in an increase of the size of direct access storage devices (DASDs), such as hard disk drives (HDDs) which are the most common mass data storage device for PCs. For example, Microsoft®'s Windows 95™ operating system and other application programs such as word processor, spread sheet, data base and Internet browser are typically all placed on a PC's HDD. It is common to have more than 300 Megabytes (MB) of "necessary" files for the most basic operation of the PC.

The loading of large amounts of data into the HDDs has became a real-life challenge. In many businesses, such as PC manufacturers and PC maintenance and service companies, it is often a task to load a large amount of the same data into multiple HDDs, or copy a large amount of data from a master HDD to a multiplicity of target HDDs. There is an increasing need for fast and reliable HDD duplicating devices which can be utilized to copy large amount of data from a master HDD to one or more target HDDs simultaneously.

The following prior art references are found to be pertinent to the relevant fields of art of the present invention:

1. U.S. Pat. No. 4,494,156 issued to Kadison et al. on Jan. 15, 1985 for "Selectable Format Computer Disk Copier Machine" (hereafter "the Kadison Patent");

2. U.S. Pat. No. 4,727,509 issued to Johnson et al. on Feb. 23, 1988 for "Master/Slave System For Replicating/Formatting Flexible Magnetic Diskettes" (hereafter "the Johnson Patent");

3. U.S. Pat. No. 4,862,411 issued to Dishon et al. on Aug. 29, 1989 for "Multiple Copy Data Mechanism On Synchronous Disk Drives" (hereafter "the Dishon Patent");

4. U.S. Pat. No. 4,864,431 issued to Murase on Sep. 5, 1989 for "Tape Dubbing Apparatus In Which Each Of A Plurality of Slave Recorders Is Operated In Synchronism With A Master Player" (hereafter "the Murase Patent");

5. U.S. Pat. No. 4,866,601 issued to DuLac et al. on Sep. 12, 1989 for "Digital Data Bus Architecture For Computer Disk Drive Controller" (hereafter "the DuLac Patent");

6. U.S. Pat. No. 5,167,020 issued to Kahn et al. On Nov. 24, 1992 for "Serial Data Transmitter With Dual Buffers Operating Separately And Having Scan And Self Test Modes" (hereafter "the Kahn Patent");

7. U.S. Pat. No. 5,235,683 issued Dahlerud on Aug. 10, 1993 for "Method And Apparatus For Accessing Peripheral Storage With Asychronized Individual Requests To A Host Processor" (hereafter "the Dahlerud Patent"); and 8. U.S. Pat. No. 5,241,526 issued to Ishii on Aug. 31, 1993 for "Recording Data Processing System For Optical Recording" (hereafter "the Ishii Patent").

The Kadison Patent discloses a selectable format computer disk copier machine. It uses a host computer, disk controller, disk drive, and mechanical disk feeder in order to automatically copy information onto each of a number of disks.

The Johnson Patent discloses a master/slave system for replicating/formatting flexible magnetic diskettes. It comprises a CPU section which has a Kopy Module and two associated manual modules, and is coupled by a daisy-chained bidirectional data Way to a plurality of slave stations. The Kopy Module stores a plurality of possible diskette formats as well as operator-introduced copy and duplicating instructions. Blank diskettes are fed into the slaves and the blank diskettes are formatted with information supplied by the master. A translator contained within the Kopy Module allows diskettes bearing all of the commonly used data encoding techniques to be replicated.

The Dishon Patent discloses a multiple copy data mechanism on synchronous disk drives. The system includes a host central processing unit (CPU) which is connected to control units and a plurality of direct access storage devices (DASDs) are predetermined to record the same data from the CPU. The DASDs are kept rotationally synchronized with one another except during the power up. The DASD synchronization is controlled and maintained by synchronization control means independent of any commands from the CPU. When one or more commands are transferred from the CPU to a control unit over a single data transfer path between them, desired identical records on the synchronized DASDs are concurrently located while the DASDs are reconnected to the data transfer path. Upon locating the desired identical records, the DASDs are reconnected to the data transfer path. Then, a write command is transferred from the CPU to the control unit form concurrently recording the same data onto the synchronized DASDs at the desired record locations.

The Murase Patent discloses a tape dubbing apparatus in which each of a plurality of slave recorders is operated in synchronism with a master player. Each slave recorder has at least one rotary magnetic head for repeatedly scanning a respective magnetic recording tape and receiving from the master tape player a signal to be recorded along with an external sync or reference signal. Each slave recorder is provided with a respective time base adjusting memory in which the signal to be recorded is written in synchronism with the external reference signal and from which the signal to be recorded is read-out in synchronism with a reference pulse generated in timed relation to a predetermined rotational position of the respective rotary magnetic head.

The DuLac Patent discloses a digital data bus architecture for a computer disk drive controller. The disk drive controller bus architecture enables the controller to be interfaced with disk drives having widely varying data format requirements in a configuration that is user-programmable and implementable on a single semiconductor chip. The bus architecture comprises a disk drive parameter storage section, a disk drive parameter comparator/interface section and a set of associated data buses, coupled between a disk drive control processor and the disk drive.

The Dahlerud Patent discloses a method and apparatus for accessing peripheral storage with asychronized individual requests to a host processor. The apparatus duplicates data from multiple magnetic disks and tapes, where the host processor functions as a data source and a plurality of peripheral storage devices function as data receivers, and are connected to one another via a data bus and a control bus.

The Kahn Patent discloses a serial data transmitter with dual buffers operating separately and having scan and self test modes.

The Ishii Patent discloses a recording data producing system for an optical recording. The audio information and the video information are converted by a computer into the information conforming to the CD-I data format, in which the amount of the converted software corresponds to at least the capacity of an optical disc and is stored in the memory.

In summary, there are three most common methods developed by the PC industry to address the need of duplicating HDDs: (1) Using the operating system to copy a source HDD to a target HDD; (2) Using a network to copy files from a centralized source HDD to many computers. Each computer includes one target HDD; and (3) Using a specialized duplicating device to copy a source HDD to many target HDDs at the same time.

The first method utilizes the operating system of a PC to copy HDDs. It first prepares a master HDD with the application programs. This master HDD is used as the source HDD. Once the source HDD is available, the user activates the computers' built-in functions to copy files from the source HDD to a designated Target HDD. The typical PC allows for only two HDDs to connect to the same interface cable, so duplicating HDDs must be done one at a time. The HDDs have to be configured by moving few jumpers on the master and target HDDs. However, there is often a compatibility problem because not all HDDs work with all other HDDs. This single copy process is also very time consuming because the file content is transferred from the source HDD to the computer memory first, and then transferred to the target HDD. For example, copying 200 MB from one drive to another using a high performance PC and disk drives takes about 9 minutes.

The second method utilizes a network to copy HDDs. It first prepares an image of the HDD on a centralized file server. Once the image is available, the user activates the computers' built-in functions with the network access functions to copy files from the file server, via the network, to the target HDD. This method is most suitable when the HDD is installed in the computer's enclosure as part of the PC manufacturing process. The HDD is not removed from the computer enclosure. The method is also time consuming because the HDD has to be first initialized to be recognized by the computer, and the file content is transferred to the computer memory first, and then transferred to the target HDD. Also, the computer must have a network connection installed for the duplication process to take place. However, network connection is not a standard feature of the PC.

The third method utilizes a specialized duplicating system. It first prepares a master HDD with the application programs. This master HDD is used as the source HDD. Once the source HDD is available, the user activates the duplicating system's functions to copy the files from the source HDD to many designated target HDDs. A high cost duplication system allows for up to 16 target HDDs to be created at the same time. A moderate cost duplication system allows for up to 4 target HDDs to be created at the same time.

There is still a need for a reliable high speed and low cost portable duplicating device for generating multiple copies of the same data and recording them onto multiple HDDs, which can be used in connection with a PC as a user interface for controlling the duplication process.

SUMMARY OF THE INVENTION

The present invention is a method of and an apparatus for duplicating direct access storage devices (DASDs) such as hard disk drives (HDDs). The present invention apparatus includes a portable HDD duplicator which can be connected to an existing personal computer (PC). The present invention method includes the steps of providing direct data paths between the source HDD and the target HDDs and performing high-level copy and comparison functions by reading the source HDD and writing to the target HDDs at the same time.

Described generally, the present invention apparatus is a portable hard disk drive (HDD) duplicator connectable to a parallel port of a personal computer (PC) for simultaneously duplicating data from a source HDD to at least one target HDD. The portable HDD duplicator includes basically: (1) a parallel port interface connected to the parallel port of the PC through a parallel port connector; (2) a source HDD data bus switch connected to the source HDD through a source HDD connector; (3) at least one target HDD data bus switch connected to the at least one target HDD through at least one target HDD connector; (4) a main data bus connected to the parallel port interface, the source HDD data bus switch, and the at least one target HDD data bus switch for providing direct data path between the PC and the source HDD, between the PC and the at least one target HDD, and between the source HDD and the at least one target HDD; (5) a source HDD control signal switch connected to the source HDD connector for providing a source HDD control signal to the source HDD; (6) at least one target HDD control signal switch connected to the at least one target HDD connector for providing a target HDD control signal to the at least one target HDD; and (7) a control signal generator connected to the parallel port interface for receiving the input control signals and generating output control signals, and connected to, and providing the output control signals to control the operation of, the source HDD data bus switch and control signal switch, and the at least one target HDD data bus switch and control signal switch, such that reading data from the source HDD and writing data to the at least one target HDD are simultaneously performed.

Described alternatively, the present invention is a method of using a portable hard disk drive (HDD) duplicator for simultaneously duplicating data from a source HDD to at least one target HDD utilizing a parallel port of a personal computer (PC). The present invention method basically includes the following steps: (1) connecting the portable HDD duplicator to the parallel port of the PC; (2) connecting the portable HDD duplicator to the source HDD; (3) connecting the portable HDD duplicator to the at least one target HDD; (4) performing low-level read and write operations to access the source HDD and the at least one target HDD and ascertain HDD information and parameters therefrom; (5) providing direct data paths between the PC and the source HDD, between the PC and the at least one target HDD, and between the source HDD and the at least one target HDD; and (6) performing high-level read and write operations to copy data directly from the source HDD to the at least one target HDD simultaneously, where reading data from the source HDD and writing data to the at least one target HDD are simultaneously performed.

The primary novel features of the present invention include: (1) the PC can read and write to the source HDD, or any of the target HDDs; (2) multiple target HDDs can be created at the same time; (3) data flows from the source HDD to the multiple target HDDs directly without having the data saved in the PC memory; and (4) the speed of duplicating multiple HDDs simultaneously is significantly increased.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
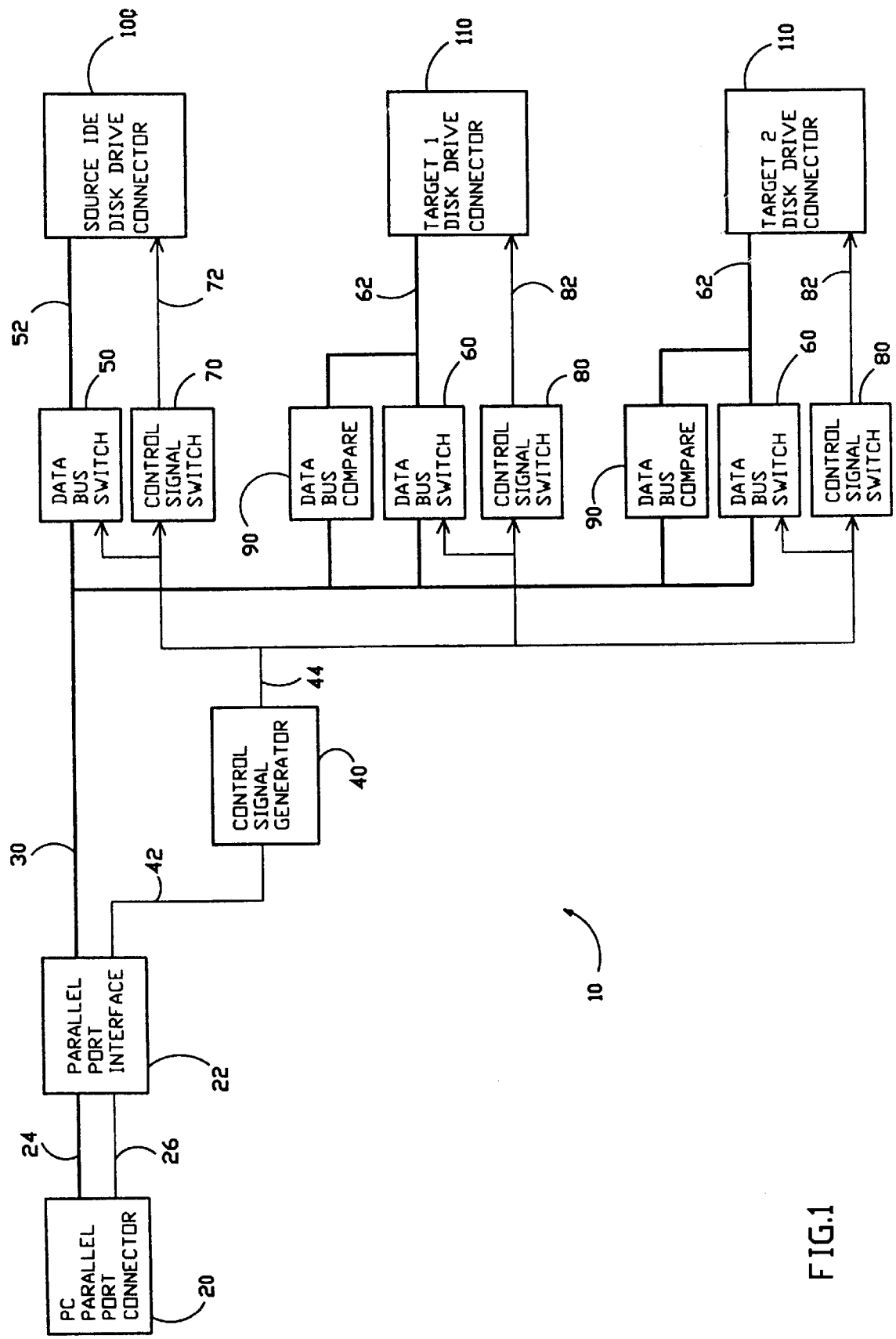
FIG. 1 is a block diagram illustrating one of the preferred embodiments of the present invention hard disk drive duplicator.

Referring to FIG. 1, there is shown at 10 a block diagram illustrating one of the preferred embodiments of the present invention hard disk drive (HDD) duplicator. In this embodiment, no micro-controller is utilized. The software on the personal computer (PC) performs the low level read and write operation sequences needed to access the HDD.

The present invention HDD duplicator includes a PC parallel port connector 20 which provides for the physical connection between a PC (not shown) and the HDD duplicator. The connection is done, for example, via a cable assembly using standard connector headers.

The HDD duplicator also includes a parallel port interface 22 which has the circuit needed to store commands, read status, and convert, for example, from an 8-bit bus used by the parallel port to a 16-bit bus used by an IDE HDD. The parallel port interface 22 may be defined, for example, in the IEEE 1284-1994 Standard, and the Enhanced Parallel Port (EPP) protocol may be used.

The HDD duplicator also includes a parallel port data bus 22 which, for example, may be an 8-bit bi-directional bus providing data and commands to the HDD duplicator, and a control signal bus 26 which, for example, may use control signals by the EPP protocol as defined in the IEEE 1284-1994 Standard.

The HDD duplicator further includes a main data bus 30 which may be, for example, a 16-bit bi-directional bus providing data path among the source HDD, the target HDDs and the PC (via the parallel port). It also provides the data to the data bus comparators.

The HDD duplicator further includes a control signal generator 40 which generates a sequence of signals used to coordinate the HDD read and write operations. It also controls the data path direction. The input signals 42 to the control signal generator 40 are used to set the mode of operation and to activate the control signal generator 40. The output signals 44 generated by the control signals generator 40 are used to set the mode of operation and to activate the access to the HDDs.

The HDD duplicator also includes a data bus switch 50 for the source HDD and one or more data bus switches 60 for the target HDDs. They are controlled by the control signal generator 40 and connect the main data bus 30 to the data bus 52 for the source HDD and data buses 62 for the target HDDs, respectively. These data buses 52 and 62 may be, for example, 16-bit bi-directional buses providing data path to the individual HDDs.

The HDD duplicator also includes a control signal switch 70 for the source HDD and one or more control signal switches 80 for the target HDDs. They are controlled by the control signal generator 40 and are used for providing a source HDD control signal 72 to the source HDD and target HDD control signals 82 to target HDDs, respectively, to activate and monitor the respective HDDs.

The HDD duplicator also includes one or more data bus comparators 90 which provide for the hardware compare function used for data recording verification. The data bus comparators 90 compare, for example, the 16-bit data path from the source HDD with the data path provided by the individual target HDDs. The compare results are provided to the PC through the parallel port interface 22.

The HDD duplicator further includes a source HDD connector 100 and one or more target HDD connectors 110. The HDD connectors 100 and 110 provide for the physical connection between the HDD duplicator and the source HDD (not shown) and target HDDs (not shown), respectively. The connection is done, for example, via a standard 40-pos ribbon cable assembly using standard connector headers. A power supply connector header is also provided for each HDD.

Figure 2:
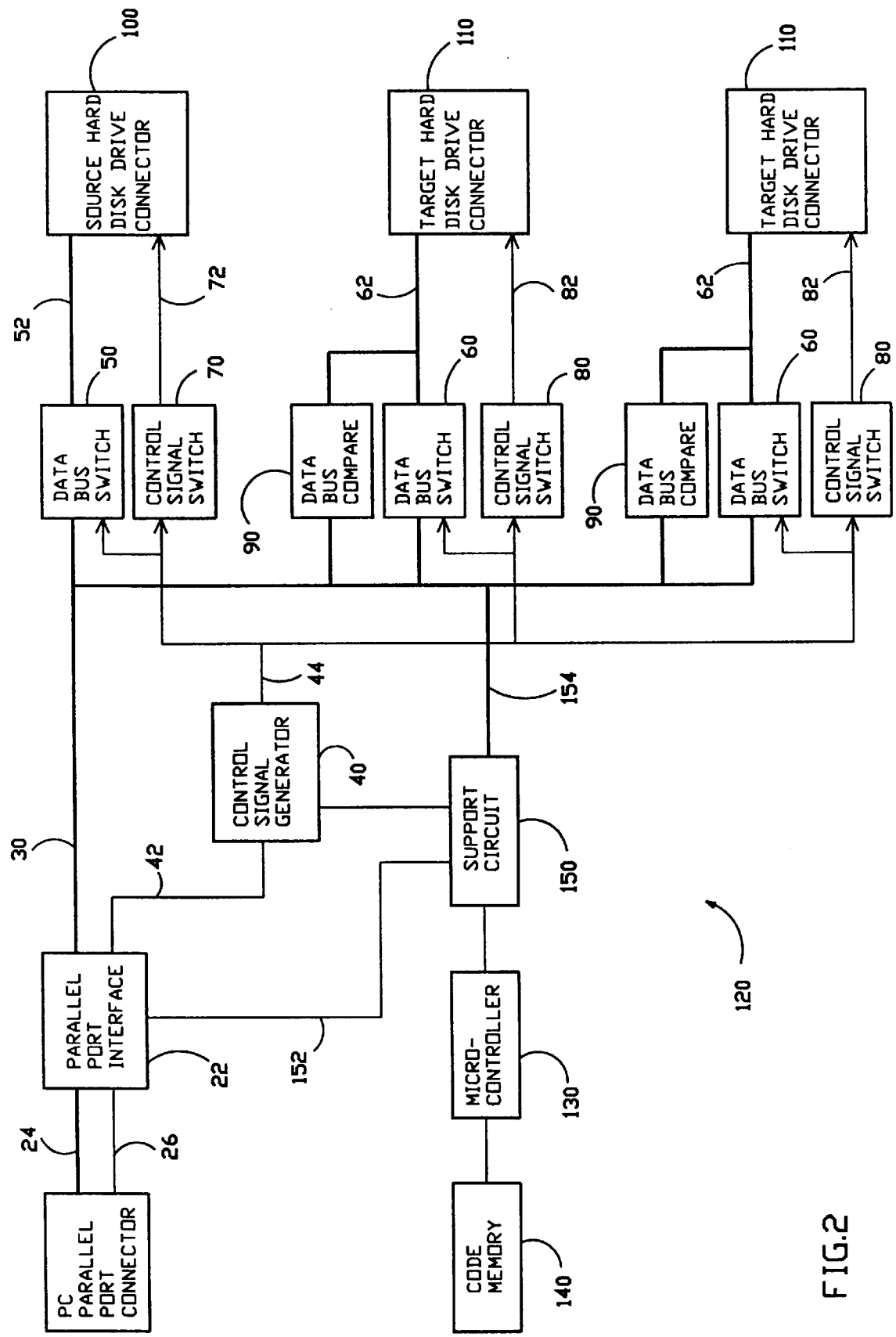
FIG. 2 is a block diagram illustrating another one of the preferred embodiments of the present invention hard disk drive duplicator.

Referring to FIG. 2, there is shown at 120 a block diagram illustrating another one of the preferred embodiments of the present invention HDD duplicator. In this embodiment, a micro-controller 130 is utilized to provide the processing power to perform the low level HDD read and write operation sequences. The PC software issues high level commands to be executed by the micro-controller in the Disk drive Duplicator. The utilization of the micro-controller 130 off-loads the low level tasks from the PC, which is an important feature for multi-tasking operating systems such as Windows 95™.

The micro-controller 130 receives commands from the PC. Next, each HDD is issued a command to satisfy the high-level command requested by the PC. The micro-controller 130 monitors the HDD command service progress. When all HDDs complete the command service, the micro-controller 130 reports the results to the PC. A code memory device 140 may be used to provide the code memory used by the micro-controller 130. Further, a micro-controller support circuit 150 is used for the support circuit needed by the micro-controller 130. This includes the path 152 for communication with the PC and the path 154 for communication with the HDDs. The micro-controller 130 may also gain control over the low-byte of the main bus 30 in order to issue commands to the HDDs and read the HDD status.

Figure 3:
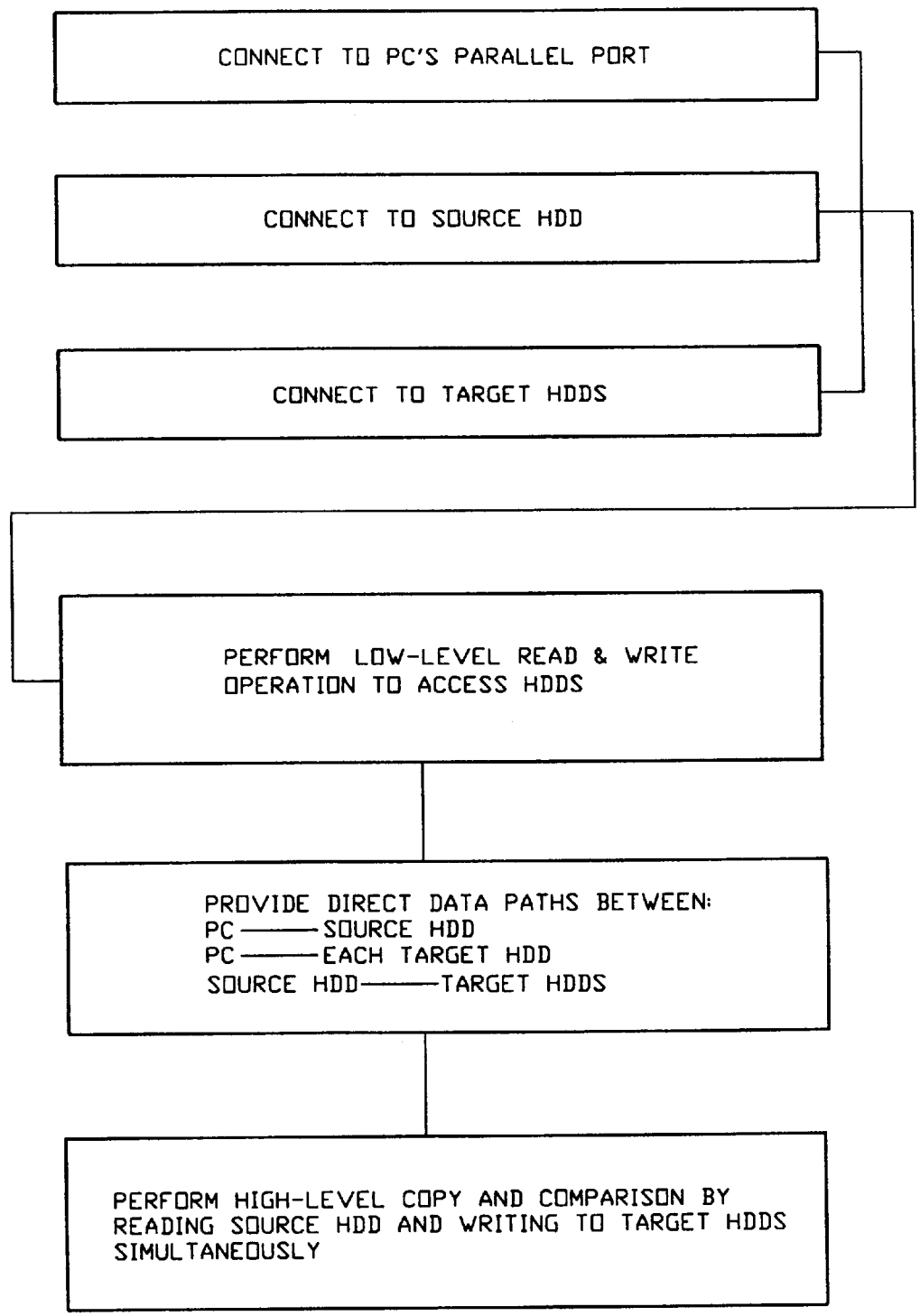
FIG. 3 is a flow-chart diagram illustrating one of the preferred embodiments of the present invention hard disk drive duplicating method.

Referring to FIG. 3, there is shown at 200 a flow-chart diagram illustrating one of the preferred embodiments of the present invention method of HDD duplicating. The basic steps of this preferred embodiments of the present invention HDD duplicating method includes connecting the portable HDD duplicator to a PC's parallel port, to a source HDD and one or more target HDDs. Then a low-level read and write operation is performed to access the HDDs. This low-level operation may be performed by the PC or, if the portable HDD duplicator has a micro-controller, by the micro-controller. During the low-level read and write operation, the physical parameters and format and file information of the source and target HDDs are ascertained, so that the subsequent high-level functions are performed in an "intelligent" manner in which the target HDDs are automatically configured to receive data correctively from the source HDD, even when the target HDDs and the source HDD are from different manufacturers and have different physical parameters.

The control signal generator in the portable HDD duplicator then generates control signals which control the data bus switches and control signal switches to provide direct data paths between the PC and the source HDD, the PC and the target HDDs, and most importantly, the source HDD and the target HDDs. The high-level copy and comparison functions of the portable HDD duplicator are performed by reading the source HDD and writing to the target HDDs at the same time.

All these operations may be controlled and monitored by the user through the use of the PC and appropriate software program loaded and run on the PC. However, the copied data directly flows from the source HDD to the target HDDs via the data bus of the portable HDD duplicator without utilizing the PC's data buffer.

Figure 4:
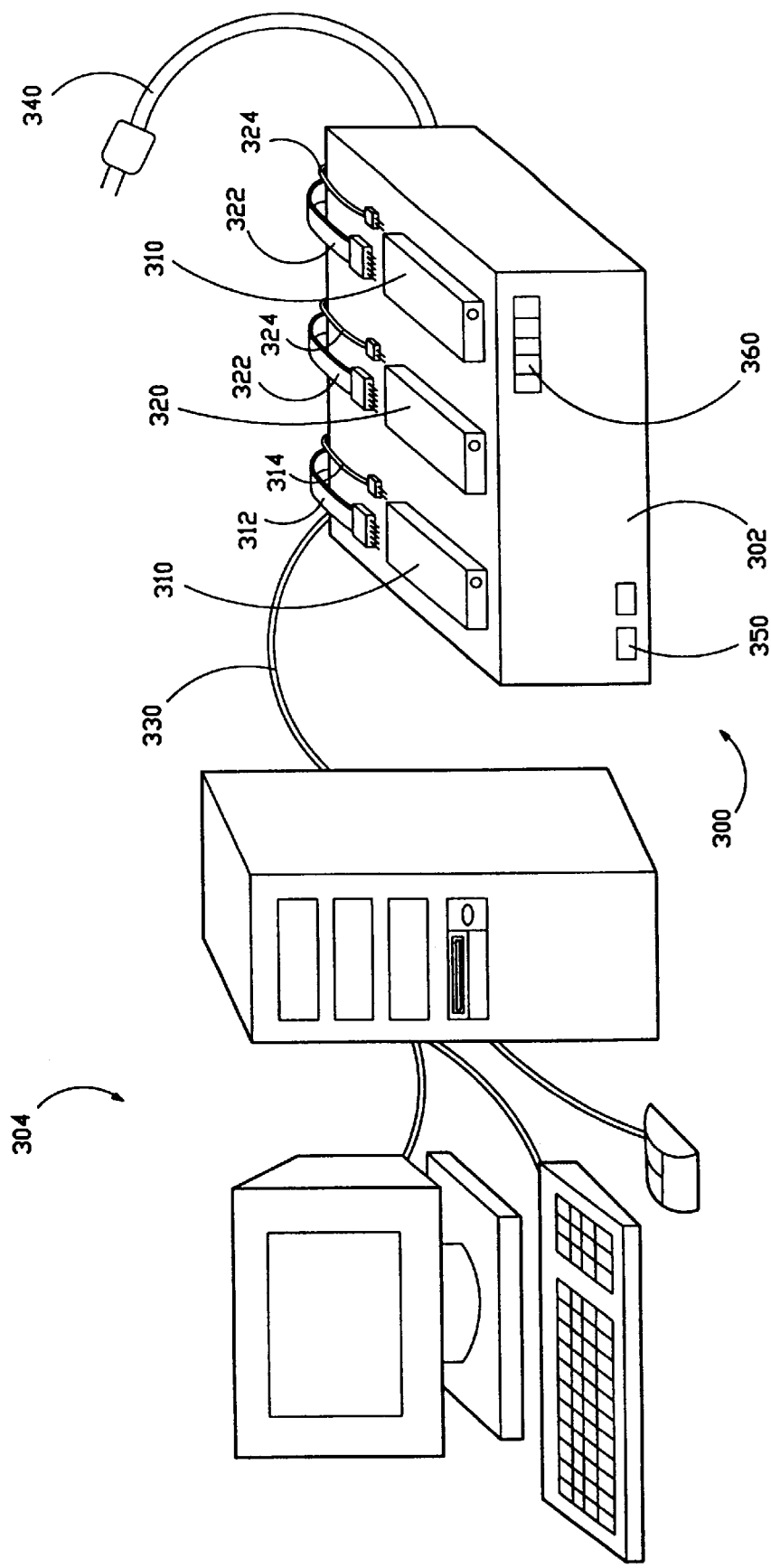
FIG. 4 is a prospective view illustrating a preferred set-up of the present invention hard disk drive duplicator, used in conjunction with a personal computer.

Referring to FIG. 4, there is shown a perspective view illustrating a preferred set-up 300 of the present invention HDD duplicator 302, used in conjunction with a PC 304 for duplicating data from a source HDD to multiple target HDDs 320. The HDD duplicator preferably has a source HDD connector 312 for connection to the source HDD, and multiple target HDD connectors 322 for connection to the multiple target HDDs, respectively. The HDD duplicator also preferably has a source HDD power supply connector 314 connected to the source HDD for providing power to the source HDD, and multiple target HDD power supply connectors 324 connected to the multiple target HDDs for providing power to the multiple target HDDs, respectively.

The portable HDD duplicator 302 may be connected to the PC's parallel port through a parallel cable 330. The portable HDD duplicator 302 may have an alternate current (AC) power cable 340 which may be plugged into an independent AC power source (not shown), or alternatively, into the power supply of the PC. Furthermore, the portable HDD duplicator may have suitable functional switches or buttons 350, and indicator displays 360 for monitoring the operation of the duplicator.

Although the connection to a parallel port of PC is illustrated, it is merely one example of the preferred embodiments of the present invention. For example, the connection between the portable HDD duplicator and PC can be made through other computer external ports, such as a serial port, an infrared port, an universal serial bus (USB), and a PCMCIA bus.

The present invention has many advantages, including but not limited to: (1) the PC can read and write to the source HDD; (2) the PC can read and write to any of the target HDDs; (3) multiple target HDDs can be created at the same time; (4) the source HDD can be created by the PC; (5) data flows from the source HDD to the multiple target HDDs directly without having the data saved in the PC memory; (6) hardware compare function is available for each of the target HDD, and the compare function is done by reading the source HDD and reading all of the target HDDs at the same time to perform a word-by-word comparison in real time; and (7) the high speed EPP protocol is utilized, which allows for fast bi-directional data exchange between the PC and the HDD duplicator.

These unique features of the present invention significantly increased the speed of duplicating multiple HDDs simultaneously. Typically, the present invention HDD duplicator is at least five times faster than conventional HDD duplicators which do not provide direct data transfer between the source HDD and the target HDD but rather pass the data through the PC's data buffer.

Defined in detail, the present invention is a portable HDD duplicator connectable to a computer external port of a PC for simultaneously duplicating data from a source HDD to a multiplicity of target HDDs, comprising: (a) a computer external port connector for connection to the computer external port of the PC; (b) a computer external port interface connected to the computer external port connector via a computer external port data bus and receiving input control signals from the computer external port connector; (c) a source HDD connector for connection to the source HDD; (d) a source HDD data bus switch connected to the source HDD connector via a bi-directional source HDD data bus; (e) a multiplicity of target HDD connectors for connection to the multiplicity of target HDDs respectively; (f) a multiplicity of target HDD data bus switches connected to the multiplicity of HDD connectors via a multiplicity of bi-directional target HDD data buses respectively; (g) a bi-directional main data bus connected to the computer external port interface, the source HDD data bus switch, and the multiplicity of target HDD data bus switches for providing direct data path between the PC and the source HDD, between the PC and the multiplicity of target HDDs, and between the source HDD and the multiplicity of target HDDs; (h) a source HDD control signal switch connected to the source HDD connector for providing a source HDD control signal to the source HDD; (i) a multiplicity of target HDD control signal switches respectively connected to the multiplicity of target HDD connectors for providing a multiplicity of respective target HDD control signals to the multiplicity of target HDDs; (j) a control signal generator connected to the computer external port interface for receiving the input control signals and generating output control signals, and connected to, and providing the output control signals to control the operation of, the source HDD data bus switch and control signal switch, the multiplicity of target HDD data bus switches and control signal switches, such that data read from the source HDD is directly duplicated to the multiplicity of target HDDs simultaneously, and reading data from the source HDD is performed at the same time as writing data simultaneously to the multiplicity of target HDDs; and (k) a multiplicity of data bus comparators connected respectively between the main data bus and the multiplicity of target HDD data buses for simultaneously comparing data read from the source HDD with data read from the multiplicity of target HDDs which has already been written to the multiplicity of target HDDs; (l) whereby the portable HDD duplicator can directly duplicate data from the source HDD to the multiplicity of target HDDs simultaneously.

Also defined in detail, the present invention is a portable HDD duplicator connectable to a computer external port of a PC for simultaneously duplicating data from a source HDD to a multiplicity of target HDDs, comprising: (a) a computer external port connector for connection to the computer external port of the PC; (b) a computer external port interface connected to the computer external port connector via a computer external port data bus and receiving input control signals from the computer external port connector; (c) a source HDD connector for connection to the source HDD; (d) a source HDD data bus switch connected to the source HDD connector via a bi-directional source HDD data bus; (e) a multiplicity of target HDD connectors for connection to the multiplicity of target HDDs respectively; (f) a multiplicity of target HDD data bus switches connected to the multiplicity of HDD connectors via a multiplicity of bi-directional target HDD data buses respectively; (g) a bi-directional main data bus connected to the computer external port interface, the source HDD data bus switch, and the multiplicity of target HDD data bus switches for providing direct data path between the PC and the source HDD, between the PC and the multiplicity of target HDDs, and between the source HDD and the multiplicity of target HDDs; (h) a source HDD control signal switch connected to the source HDD connector for providing a source HDD control signal to the source HDD; (i) a multiplicity of target HDD control signal switches respectively connected to the multiplicity of target HDD connectors for providing a multiplicity of respective target HDD control signals to the multiplicity of target HDDs; (j) a control signal generator connected to the computer external port interface for receiving the input control signals and generating output control signals, and connected to, and providing the output control signals to control the operation of, the source HDD data bus switch and control signal switch, the multiplicity of target HDD data bus switches and control signal switches, such that data read from the source HDD is directly duplicated to the multiplicity of target HDDs simultaneously, and reading data from the source HDD is performed at the same time as writing data simultaneously to the multiplicity of target HDDs; (k) a multiplicity of data bus comparators connected respectively between the main data bus and the multiplicity of target HDD data buses for simultaneously comparing data read from the source HDD with data read from the multiplicity of target HDDs which has already been written to the multiplicity of target HDDs; (l) a micro-controller for performing a plurality of functions of the portable HDD duplicator; (m) a memory element connected to the micro-controller for proving code memory to the micro-controller; and (n) a support circuit interconnecting the micro-controller, the computer external port interface, the control signal generator and the main data bus; (o) whereby the portable HDD duplicator can directly duplicate data from the source HDD to the multiplicity of target HDDs simultaneously.

Defined broadly, the present invention is a portable HDD duplicator connectable to a computer external port of a PC for directly duplicating data from a source HDD to at least one target HDD, comprising: (a) a computer external port interface connected to the computer external port of the PC through a computer external port connector; (b) a source HDD data bus switch connected to the source HDD through a source HDD connector; (c) at least one target HDD data bus switch connected to the at least one target HDD through at least one target HDD connector; (d) a main data bus connected to the computer external port interface, the source HDD data bus switch, and the at least one target HDD data bus switch for providing direct data path between the PC and the source HDD, between the PC and the at least one target HDD, and between the source HDD and the at least one target HDD; (e) a source HDD control signal switch connected to the source HDD connector for providing a source HDD control signal to the source HDD; (f) at least one target HDD control signal switch connected to the at least one target HDD connector for providing a target HDD control signal to the at least one target HDD; and (g) a control signal generator connected to the computer external port interface, and connected to, and controlling the operation of, the source HDD data bus switch and control signal switch, the at least one target HDD data bus switch and control signal switch, such that data read from the source HDD is directly duplicated to the at least one target HDD, and reading data from the source HDD is performed at the same time as writing data to the at least one target HDD.

Defined more broadly, the present invention is a portable HDD duplicator connectable to a computer external port of a PC for directly duplicating data from a source HDD to at least one target HDD, comprising: (a) a computer external port interface connected to the computer external port of the PC through a computer external port connector; (b) a source HDD data bus switch connected to the source HDD through a source HDD connector; (c) at least one target HDD data bus switch connected to the at least one target HDD through at least one target HDD connector; (d) a main data bus connected to the computer external port interface, the source HDD data bus switch, and the at least one target HDD data bus switch for providing direct data path between the source HDD and the at least one target HDD; (e) a source HDD control signal switch connected to the source HDD connector for providing a source HDD control signal to the source HDD; and (f) at least one target HDD control signal switch connected to the at least one target HDD connector for providing a target HDD control signal to the at least one target HDD for directly duplicating data from the source HDD to the at least one target HDD.

Alternatively defined in detail, the present invention is a method of using a portable HDD duplicator for simultaneously duplicating data from a source HDD to a multiplicity of target HDDs utilizing a computer external port of a PC, comprising the steps of: (a) connecting the portable HDD duplicator to the computer external port of the PC; (b) connecting the portable HDD duplicator to the source HDD; (c) connecting the portable HDD duplicator to the multiplicity of target HDDs; (d) using the PC for controlling the portable HDD duplicator to perform read and write operations to access the source HDD and the multiplicity of target HDDs and ascertain HDD information and parameters therefrom; (e) providing direct data paths between the PC and the source HDD, between the PC and the multiplicity of target HDDs, and between the source HDD and the multiplicity of target HDDs; (f) performing read and write operations to duplicate data directly from the source HDD to the multiplicity of target HDDs simultaneously, where reading data from the source HDD is performed at the same time as writing data to the multiplicity of target HDDs; and (g) comparing data read from the source HDD with data read from the multiplicity of target HDDs which has already been written to the multiplicity of target HDDs.

Also alternatively defined in detail, the present invention is a method of using a portable HDD duplicator for simultaneously duplicating data from a source HDD to a multiplicity of target HDDs utilizing a computer external port of a PC, comprising the steps of: (a) connecting the portable HDD duplicator to the computer external port of the PC; (b) connecting the portable HDD duplicator to the source HDD; (c) connecting the portable HDD duplicator to the multiplicity of target HDDs; (d) utilizing an internal micro-controller for controlling the portable HDD duplicator to perform read and write operations to access the source HDD and the multiplicity of target HDDs and ascertain HDD information and parameters therefrom; (e) providing direct data paths between the PC and the source HDD, between the PC and the multiplicity of target HDDs, and between the source HDD and the multiplicity of target HDDs; (f) performing read and write operations to duplicate data directly from the source HDD to the multiplicity of target HDDs simultaneously, where reading data from the source HDD is performed at the same time as writing data to the multiplicity of target HDDs; and (g) comparing data read from the source HDD with data read from the multiplicity of target HDDs which has already been written to the multiplicity of target HDDs.

Alternatively defined broadly, the present invention is a method of using a portable HDD duplicator for directly duplicating data from a source HDD to at least one target HDD utilizing a computer external port of a PC, comprising the steps of: (a) connecting the portable HDD duplicator to the computer external port of the PC; (b) connecting the portable HDD duplicator to the source HDD; (c) connecting the portable HDD duplicator to the at least one target HDD; (d) performing read and write operations to access the source HDD and the at least one target HDD and ascertain HDD information and parameters therefrom; (e) providing direct data paths between the PC and the source HDD, between the PC and the at least one target HDD, and between the source HDD and the at least one target HDD; and (f) performing read and write operations to duplicate data directly from the source HDD to the at least one target HDD where reading data from the source HDD is performed at the same time as writing data to the at least one target HDD.

Alternatively defined more broadly, the present invention is a method of using a portable HDD duplicator for directly duplicating data from a source HDD to at least one target HDD utilizing a computer external port of a PC, comprising the steps of: (a) connecting the portable HDD duplicator to the computer external port of the PC; (b) connecting the portable HDD duplicator to the source HDD; (c) connecting the portable HDD duplicator to the at least one target HDD; (d) providing direct data paths between the source HDD and the at least one target HDD; and (e) performing read and write operations to duplicate data directly from the source HDD to the at least one target HDD.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A portable hard disk drive (HDD) duplicator connectable to a computer external port of a personal computer (PC) for simultaneously duplicating data from a source HDD to a multiplicity of target HDDs, comprising:

a. a computer external port connector for connection to said computer external port of said PC;

b. a computer external port interface connected to said computer external port connector via a computer external port data bus and receiving input control signals from said computer external port connector;

c. a source HDD connector for connection to said source HDD;

d. a source HDD data bus switch connected to said source HDD connector via a bi-directional source HDD data bus;

e. a multiplicity of target HDD connectors for connection to said multiplicity of target HDDs respectively;

f. a multiplicity of target HDD data bus switches connected to said multiplicity of HDD connectors via a multiplicity of bi-directional target HDD data buses respectively;

g. a bi-directional main data bus connected to said computer external port interface, said source HDD data bus switch, and said multiplicity of target HDD data bus switches for providing direct data path between said PC and said source HDD, between said PC and said multiplicity of target HDDs, and between said source HDD and said multiplicity of target HDDs;

h. a source HDD control signal switch connected to said source HDD connector for providing a source HDD control signal to said source HDD;

i. a multiplicity of target HDD control signal switches respectively connected to said multiplicity of target HDD connectors for providing a multiplicity of respective target HDD control signals to said multiplicity of target HDDs;

j. a control signal generator connected to said computer external port interface for receiving said input control signals and generating output control signals, and connected to, and providing said output control signals to control the operation of, said source HDD data bus switch and control signal switch, said multiplicity of target HDD data bus switches and control signal switches, such that data read from said source HDD is directly duplicated to said multiplicity of target HDDs simultaneously, and reading data from said source HDD is performed at the same time as writing data simultaneously to said multiplicity of target HDDs;

k. a multiplicity of data bus comparators connected respectively between said main data bus and said multiplicity of target HDD data buses for simultaneously comparing data read from said source HDD with data read from said multiplicity of target HDDs which has already been written to said multiplicity of target HDDs; and l. said data bus switches and said control signal switches controlled by said output signals to operate said direct data path between said source HDD and said multiplicity of target HDDs such that the copied data directly flows from said source HDD to said multiplicity of target HDDs without utilizing any memory buffer;

m. whereby said portable HDD duplicator can directly duplicate data from said source HDD to said multiplicity of target HDDs simultaneously.

2. The apparatus as defined in claim 1 wherein said computer external port interface converts said computer external port data bus to said main data bus.

3. The apparatus as defined in claim 1 further comprising functional switches.

4. The apparatus as defined in claim 1 further comprising indicator displays for monitoring the operation of said portable HDD duplicator.

5. A portable hard disk drive (HDD) duplicator connectable to a computer external port of a personal computer (PC) for simultaneously duplicating data from a source HDD to a multiplicity of target HDDs, comprising:

a. a computer external port connector for connection to said computer external port of said PC;

b. a computer external port interface connected to said computer external port connector via a computer external port data bus and receiving input control signals from said computer external port connector;

c. a source HDD connector for connection to said source HDD;

d. a source HDD data bus switch connected to said source HDD connector via a bi-directional source HDD data bus;

e. a multiplicity of target HDD connectors for connection to said multiplicity of target HDDs respectively;

f. a multiplicity of target HDD data bus switches connected to said multiplicity of HDD connectors via a multiplicity of bi-directional target HDD data buses respectively;

g. a bi-directional main data bus connected to said computer external port interface, said source HDD data bus switch, and said multiplicity of target HDD data bus switches for providing direct data path between said PC and said source HDD, between said PC and said multiplicity of target HDDs, and between said source HDD and said multiplicity of target HDDs;

h. a source HDD control signal switch connected to said source HDD connector for providing a source HDD control signal to said source HDD;

i. a multiplicity of target HDD control signal switches respectively connected to said multiplicity of target HDD connectors for providing a multiplicity of respective target HDD control signals to said multiplicity of target HDDs;

j. a control signal generator connected to said computer external port interface for receiving said input control signals and generating output control signals, and connected to, and providing said output control signals to control the operation of, said source HDD data bus switch and control signal switch, said multiplicity of target HDD data bus switches and control signal switches, such that data read from said source HDD is directly duplicated to said multiplicity of target HDDs simultaneously, and reading data from said source HDD is performed at the same time as writing data simultaneously to said multiplicity of target HDDs;

k. a multiplicity of data bus comparators connected respectively between said main data bus and said multiplicity of target HDD data buses for simultaneously comparing data read from said source HDD with data read from said multiplicity of target HDDs which has already been written to said multiplicity of target HDDs;

l. a micro-controller for performing a plurality of functions of said portable HDD duplicator;

m. a memory element connected to said micro-controller for providing code memory to said micro-controller;

n. a support circuit interconnecting said micro-controller, said computer external port interface, said control signal generator and said main data bus; and o. said data bus switches and said control signal switches controlled by output signals to operate said direct data path between said source HDD and said multiplicity of target HDDs such that the copied data directly flows from said source HDD to said multiplicity of target HDDs without utilizing any memory buffer;

p. whereby said portable HDD duplicator can directly duplicate data from said source HDD to said multiplicity of target HDDs simultaneously.

6. The apparatus as defined in claim 5 wherein said computer external port interface converts said computer external port data bus to said main data bus.

7. A portable hard disk drive (HDD) duplicator connectable to a computer external port of a personal computer (PC) for simultaneously duplicating data from a source HDD to at least one target HDD, comprising:

a. a computer external port interface connected to said computer external port of said PC through a computer external port connector;

b. a source HDD data bus switch connected to said source HDD through a source HDD connector;

c. at least one target HDD data bus switch connected to said at least one target HDD through at least one target HDD connector;

d. a main data bus connected to said computer external port interface, said source HDD data bus switch, and said at least one target HDD data bus switch for providing direct data path between said PC and said source HDD, between said PC and said at least one target HDD, and between said source HDD and said at least one target HDD;

e. a source HDD control signal switch connected to said source HDD connector for providing a source HDD control signal to said source HDD;

f. at least one target HDD control signal switch connected to said at least one target HDD connector for providing a target HDD control signal to said at least one target HDD;

g. a control signal generator connected to said computer external port interface, and connected to, and controlling the operation of, said source HDD data bus switch and control signal switch, said at least one target HDD data bus switch and control signal switch, such that data read from said source HDD is directly duplicated to said at least one target HDD, and reading data from said source HDD is performed at the same time as writing data to said at least one target HDD;

h. an internal micro-controller connected to said control signal generator and said main data bus for controlling said portable HDD duplicator to perform read and write operations to access said source HDD and said at least one target HDD and ascertain HDD information and parameters therefrom; and i. said data bus switches and said control signal switches controlled by said control signal generator to operate said direct data path between said source HDD and said at least one target HDD such that the copied data directly flows from said source HDD to said at least one target HDD without utilizing any memory buffer.

8. The apparatus as defined in claim 7 further comprising a computer external port data bus for connecting said computer external port connector and said computer external port interface.

9. The apparatus as defined in claim 7 further comprising a source HDD data bus for connecting said source HDD data bus switch and said source HDD connector.

10. The apparatus as defined in claim 7 further comprising at least one target HDD data bus for connecting said at least one target HDD data bus switch and said at least one target HDD connector.

11. The apparatus as defined in claim 7 further comprising at least one data bus comparator connected to said main data bus and said at least one target HDD data bus for comparing data read from said source HDD with data read from said at least one target HDD which has already been written to said at least one target HDD.

12. A portable hard disk drive (HDD) duplicator connectable to a computer external port of a personal computer (PC) for simultaneously duplicating data from a source HDD to at least one target HDD, comprising:
   a. a computer external port interface connected to said computer external port of said PC through a computer external port connector;
   b. a source HDD data bus switch connected to said source HDD through a source HDD connector;
   c. at least one target HDD data bus switch connected to said at least one target HDD through at least one target HDD connector;
   d. a main data bus connected to said computer external port interface, said source HDD data bus switch, and said at least one target HDD data bus switch for providing direct data path between said source HDD and said at least one target HDD;
   e. a source HDD control signal switch connected to said source HDD connector for providing a source HDD control signal to said source HDD;
   f. at least one target HDD control signal switch connected to said at least one target HDD connector for providing a target HDD control signal to said at least one target HDD for directly duplicating data from said source HDD to said at least one target HDD;
   g. an internal means connected to said control signal generator and said main data bus for controlling said portable HDD duplicator to perform read and write operations to access said source HDD and said at least one target HDD and ascertain HDD information and parameters therefrom; and
   h. said data bus switches and said control signal switches controlled by said internal means to operate said direct data path between said source HDD and said at least one target HDD such that the copied data directly flows from said source HDD to said at least one target HDD without utilizing any memory buffer.

13. The apparatus as defined in claim 12 further comprising at least one data bus comparator connected to said main data bus and said at least one target HDD data bus for comparing data read from said source HDD with data read from said at least one target HDD which has already been written to said at least one target HDD.

14. The apparatus as defined in claim 12 further comprising a control signal generator connected to said computer external port interface, and connected to, and controlling the operation of, said source HDD data bus switch and control signal switch, said at least one target HDD data bus switch and control signal switch, such that reading data from said source HDD is performed at the same time as writing data to said at least one target HDD.

15. A method of using a portable hard disk drive (HDD) duplicator for simultaneously duplicating data from a source HDD to a multiplicity of target HDDs utilizing a computer external port of a personal computer (PC), comprising the steps of:
   a. connecting said portable HDD duplicator to said computer external port of said PC;
   b. connecting said portable HDD duplicator to said source HDD;
   c. connecting said portable HDD duplicator to said multiplicity of target HDDs;
   d. using said PC for controlling said portable HDD duplicator to perform read and write operations to access said source HDD and said multiplicity of target HDDs and ascertain HDD information and parameters therefrom;
   e. providing direct data paths between said PC and said source HDD, between said PC and said multiplicity of target HDDs, and between said source HDD and said multiplicity of target HDDs;
   d. providing a source HDD data bus switch and control signal switch, and a multiplicity of target HDD data bus switches and control signal switches, controlling the switches to operate said direct data path between said source HDD and said multiplicity of target HDDs such that the copied data directly flows from said source HDD to said multiplicity of target HDDs without utilizing any memory buffer;
   f. performing read and write operations to duplicate data directly from said source HDD to said multiplicity of target HDDs simultaneously, where reading data from said source HDD is performed at the same time as writing data to said multiplicity of target HDDs; and
   g. comparing data read from said source HDD with data read from said multiplicity of target HDDs which has already been written to said multiplicity of target HDDs.

16. The method as defined in claim 15 further comprising the step of providing power to said source HDD and said multiplicity of target HDDs.

17. The method as defined in claim 15 further comprising the step of monitoring the operation of said portable HDD duplicator.

18. A method of using a portable hard disk drive (HDD) duplicator for simultaneously duplicating data from a source HDD to a multiplicity of target HDDs utilizing a computer external port of a personal computer (PC), comprising the steps of:
   a. connecting said portable HDD duplicator to said computer external port of said PC;
   b. connecting said portable HDD duplicator to said source HDD;
   c. connecting said portable HDD duplicator to said multiplicity of target HDDs;
   d. utilizing an internal micro-controller for controlling said portable HDD duplicator to perform read and write operations to access said source HDD and said multiplicity of target HDDs and ascertain HDD information and parameters therefrom;
   e. providing direct data paths between said PC and said source HDD, between said PC and said multiplicity of target HDDs, and between said source HDD and said multiplicity of target HDDs;
   f. providing a source HDD data bus switch and control signal switch, and a multiplicity of target HDD data bus switches and control signal switches, controlling the switches to operate said direct data path between said source HDD and said multiplicity of target HDDs such that the copied data directly flows from said source HDD to said multiplicity of target HDDs without utilizing any memory buffer;

g. performing read and write operations to duplicate data directly from said source HDD to said multiplicity of target HDDs simultaneously, where reading data from said source HDD is performed at the same time as writing data to said multiplicity of target HDDs; and h. comparing data read from said source HDD with data read from said multiplicity of target HDDs which has already been written to said multiplicity of target HDDs.

19. The method as defined in claim 18 further comprising the step of providing power to said source HDD and said multiplicity of target HDDs.

20. The method as defined in claim 18 further comprising the step of monitoring the operation of said portable HDD duplicator.

21. The method as defined in claim 18 further comprising the step of providing code memory to said micro-controller.

22. The method as defined in claim 18 further comprising the step of providing a support circuit to said micro-controller.

23. A method of using a portable hard disk drive (HDD) duplicator for simultaneously duplicating data from a source HDD to at least one target HDD utilizing a computer external port of a personal computer (PC), comprising the steps of:

a. connecting said portable HDD duplicator to said computer external port of said PC;

b. connecting said portable HDD duplicator to said source HDD;

c. connecting said portable HDD duplicator to said at least one target HDD;

d. performing read and write operations to access said source HDD and said at least one target HDD and ascertain HDD information and parameters therefrom;

e. utilizing an internal micro-controller for controlling said portable HDD duplicator to perform read and write operations to access said source HDD and said at least one target HDD and ascertain HDD information and parameters therefrom;

f. providing direct data paths between said PC and said source HDD, between said PC and said at least one target HDD, and between said source HDD and said at least one target HDD;

g. providing a source HDD data bus switch and control signal switch, and at least one target HDD data bus switch and control signal switch, controlling the switches to operate said direct data path between said source HDD and said at least one target HDD such that the copied data directly flows from said source HDD to said at least one target HDD without utilizing any memory buffer; and h. performing read and write operations to duplicate data directly from said source HDD to said at least one target HDD where reading data from said source HDD is performed at the same time as writing data to said at least one target HDD.

24. The method as defined in claim 23 further comprising the step of providing power to said source HDD and said multiplicity of target HDDs.

25. The method as defined in claim 23 further comprising the step of monitoring the operation of said portable HDD duplicator.

26. The method as defined in claim 23 further comprising the step of utilizing said PC to control said portable HDD duplicator to perform said read and write operations.

27. The method as defined in claim 23 further comprising the step of utilizing an internal micro-controller to control said portable HDD duplicator to perform said read and write operations.

28. The method as defined in claim 23 further comprising the step of comparing data read from said source HDD with data read from said at least one target HDD which has already been written to said at least one target HDD.

29. A method of using a portable hard disk drive (HDD) duplicator for simultaneously duplicating data from a source HDD to at least one target HDD utilizing a computer external port of a personal computer (PC), comprising the steps of:

a. connecting said portable HDD duplicator to said computer external port of said PC;

b. connecting said portable HDD duplicator to said source HDD;

c. connecting said portable HDD duplicator to said at least one target HDD;

d. utilizing an internal means for controlling said portable HDD duplicator to perform read and write operations to access said source HDD and said at least one target HDD and ascertain HDD information and parameters therefrom;

e. providing direct data paths between said source HDD and said at least one target HDD;

f. providing a source HDD data bus switch and control signal switch, and at least one target HDD data bus switch and control signal switch, controlling the switches to operate said direct data path between said source HDD and said at least one target HDD such that the copied data directly flows from said source HDD to said at least one target HDD without utilizing any memory buffer; and g. performing read and write operations to duplicate data directly from said source HDD to said at least one target HDD.

30. The method as defined in claim 29 further comprising the step of performing read and write operations to access said source HDD and said at least one target HDD and ascertain HDD information and parameters therefrom.

31. The method as defined in claim 29 further comprising the step of utilizing said PC to control said portable HDD duplicator to perform said read and write operations.

32. The method as defined in claim 29 further comprising the step of utilizing an internal micro-controller to control said portable HDD duplicator to perform said read and write operations.

33. The method as defined in claim 29 further comprising the step of comparing data read from said source HDD with data read from said at least one target HDD which has already been written to said at least one target HDD.

34. A portable hard disk drive (HDD) duplicator for simultaneously duplicating data from a source HDD to a multiplicity of target HDDs, comprising:

a. a source HDD connector for connection to said source HDD;

b. a source HDD data bus switch connected to said source HDD connector via a bi-directional source HDD data bus;

c. a multiplicity of target HDD connectors for connection to said multiplicity of target HDDs respectively;

d. a multiplicity of target HDD data bus switches connected to said multiplicity of HDD connectors via a multiplicity of bi-directional target HDD data buses respectively;

e. a bi-directional main data bus connected to said source HDD data bus switch and said multiplicity of target HDD data bus switches for providing direct data path between said source HDD and said multiplicity of target HDDs;

f. a source HDD control signal switch connected to said source HDD connector for providing a source HDD control signal to said source HDD;

g. a multiplicity of target HDD control signal switches respectively connected to said multiplicity of target HDD connectors for providing a multiplicity of respective target HDD control signals to said multiplicity of target HDDs;

h. a control signal generator for generating output control signals, and connected to, and providing the output control signals to control the operation of, said source HDD data bus switch and control signal switch, said multiplicity of target HDD data bus switches and control signal switches, such that data read from said source HDD is directly duplicated to said multiplicity of target HDDs simultaneously, and reading data from said source HDD is performed at the same time as writing data simultaneously to said multiplicity of target HDDs;

i. a multiplicity of data bus comparators respectively connected between said main data bus and said multiplicity of target HDD data buses for simultaneously comparing data read from said source HDD with data read from said multiplicity of target HDDs which has already been written to said multiplicity of target HDDs; and j. said data bus switches and said control signal switches controlled by said control signal generator to operate said direct data path between said source HDD and said multiplicity of target HDDs such that the copied data directly flows from said source HDD to said multiplicity of target HDDs without utilizing any memory buffer;

k. whereby said portable HDD duplicator can directly duplicate data from said source HDD to said multiplicity of target HDDs simultaneously.

35. The portable duplicator HDD as defined in claim 34 further comprising functional switches.

36. The portable duplicator HDD as defined in claim 34 further comprising indicator displays for monitoring the operation of said portable HDD duplicator.

37. A portable hard disk drive (HDD) duplicator for simultaneously duplicating data from a source HDD to a multiplicity of target HDDs, comprising:

a. a source HDD connector for connection to said source HDD;

b. a source HDD data bus switch connected to said source HDD connector via a bi-directional source HDD data bus;

c. a multiplicity of target HDD connectors for connection to said multiplicity of target HDDs respectively;

d. a multiplicity of target HDD data bus switches connected to said multiplicity of HDD connectors via a multiplicity of bi-directional target HDD data buses respectively;

e. a bi-directional main data bus connected to said source HDD data bus switch and said multiplicity of target HDD data bus switches for providing direct data path between said source HDD and said multiplicity of target HDDs;

f. a source HDD control signal switch connected to said source HDD connector for providing a source HDD control signal to said source HDD;

g. a multiplicity of target HDD control signal switches respectively connected to said multiplicity of target HDD connectors for providing a multiplicity of respective target HDD control signals to said multiplicity of target HDDs;

h. a control signal generator for generating output control signals, and connected to, and providing the output control signals to control the operation of, said source HDD data bus switch and control signal switch, said multiplicity of target HDD data bus switches and control signal switches, such that data read from said source HDD is directly duplicated to said multiplicity of target HDDs simultaneously, and reading data from said source HDD is performed at the same time as writing data simultaneously to said multiplicity of target HDDs;

i. a multiplicity of data bus comparators respectively connected between said main data bus and said multiplicity of target HDD data buses for simultaneously comparing data read from said source HDD with data read from said multiplicity of target HDDs which has already been written to said multiplicity of target HDDs;

j. a micro-controller for performing a plurality of functions of said portable HDD duplicator;

k. a memory element connected to said micro-controller for providing code memory to said micro-controller;

l. a support circuit interconnecting said micro-controller, said control signal generator and said main data bus; and m. said data bus switches and said control signal switches controlled by said control signal generator to operate said direct data path between said source HDD and said multiplicity of target HDDs such that the copied data directly flows from said source HDD to said multiplicity of target HDDs without utilizing any memory buffer;

n. whereby said portable HDD duplicator can directly duplicate data from said source HDD to said multiplicity of target HDDs simultaneously.

38. A portable hard disk drive (HDD) duplicator for simultaneously duplicating data from a source HDD to at least one target HDD, comprising:

a. a source HDD data bus switch connected to said source HDD through a source HDD connector;

b. at least one target HDD data bus switch connected to said at least one target HDD through at least one target HDD connector;

c. a main data bus connected to said source HDD data bus switch and said at least one target HDD data bus switch for providing direct data path between said source HDD and said at least one target HDD;

d. a source HDD control signal switch connected to said source HDD connector for providing a source HDD control signal to said source HDD;

e. at least one target HDD control signal switch connected to said at least one target HDD connector for providing a target HDD control signal to said at least one target HDD;

f. a control signal generator connected to, and controlling the operation of, said source HDD data bus switch and control signal switch, said at least one target HDD data bus switch and control signal switch, such that data read from said source HDD is directly duplicated to said at least one target HDD, and reading data from said source HDD is performed at the same time as writing data to said at least one target HDD;

g. an internal micro-controller connected to said control signal generator and said main data bus for controlling said portable HDD duplicator to perform read and write operations to access said source HDD and said at least one target HDD and ascertain HDD information and parameters therefrom; and h. said data bus switches and said control signal switches controlled by said control signal generator to operate said direct data path between said source HDD and said at least one of target HDD such that the copied data directly flows from said source HDD to said at least one target HDD without utilizing any memory buffer.

39. The portable duplicator HDD as defined in claim 38 further comprising a source HDD data bus for connecting said source HDD data bus switch and said source HDD connector.

40. The portable duplicator HDD as defined in claim 38 further comprising at least one target HDD data bus for connecting said at least one target HDD data bus switch and said at least one target HDD connector.

41. The portable duplicator HDD as defined in claim 38 further comprising at least one data bus comparator connected to said main data bus and said at least one target HDD data bus for comparing data read from said source HDD with data read from said at least one target HDD which has already been written to said at least one target HDD.

42. A portable hard disk drive (HDD) duplicator for simultaneously duplicating data from a source HDD to at least one target HDD, comprising:

a. a source HDD data bus switch connected to said source HDD through a source HDD connector;

b. at least one target HDD data bus switch connected to said at least one target HDD through at least one target HDD connector;

c. a main data bus connected to said source HDD data bus switch and said at least one target HDD data bus switch for providing direct data path between said source HDD and said at least one target HDD;

d. a source HDD control signal switch connected to said source HDD connector for providing a source HDD control signal to said source HDD;

e. at least one target HDD control signal switch connected to said at least one target HDD connector for providing a target HDD control signal to said at least one target HDD for directly duplicating data from said source HDD to said at least one target HDD;

f. an internal means connected to a control signal generator and said main data bus for controlling said portable HDD duplicator to perform read and write operation to access said source HDD and said at least one target HDD and ascertain HDD information and parameters therefrom; and g. said data bus switches and said control signal switches controlled by said internal means to operate said direct data path between said source HDD and said at least one target HDD such that the copied data directly flows from said source HDD to said at least one target HDD without utilizing any memory buffer.

43. The portable duplicator HDD as defined in claim 42 further comprising at least one data bus comparator connected said main data bus and said at least one target HDD data bus for comparing data read from said source HDD with data read from said at least one target HDD which has already been written to said at least one target HDD.

44. The portable duplicator HDD as defined in claim 42 wherein said control signal generator connected to, and controlling the operation of, said source HDD data bus switch and control signal switch, said at least one target HDD data bus switch and control signal switch, such that reading data from said source HDD is performed at the same time as writing data to said at least one target HDD.

45. A method of using a portable hard disk drive (HDD) duplicator for simultaneously duplicating data from a source HDD to a multiplicity of target HDDs, comprising the steps of:

a. connecting said portable HDD duplicator to said source HDD;

b. connecting said portable HDD duplicator to said multiplicity of target HDDs;

c. using said portable HDD duplicator to perform read and write operations to access said source HDD and said multiplicity of target HDDs and ascertain HDD information and parameters therefrom;

d. providing direct data path between said source HDD and said multiplicity of target HDDs;

e. providing a source HDD data bus switch and control signal switch, and a multiplicity of target HDD data bus switches and control signal switches, controlling the switches to operate said direct data path between said source HDD and said multiplicity of target HDDs such that the copied data directly flows from said source HDD to said multiplicity of target HDDs without utilizing any memory buffer;

f. performing read and write operations to duplicate data directly from said source HDD to said multiplicity of target HDDs simultaneously, where reading data from said source HDD is performed at the same time as writing data to said multiplicity of target HDDs; and g. comparing data read from said source HDD with data read from said multiplicity of target HDDs which has already been written to said multiplicity of target HDDs.

46. The method as defined in claim 45 further comprising the step of providing power to said source HDD and said multiplicity of target HDDs.

47. The method as defined in claim 45 further comprising the step of monitoring the operation of said portable HDD duplicator.

48. A method of using a portable hard disk drive (HDD) duplicator for simultaneously duplicating data from a source HDD to a multiplicity of target HDDs, comprising the steps of:

a. connecting said portable HDD duplicator to said source HDD;

b. connecting said portable HDD duplicator to said multiplicity of target HDDs;

c. utilizing an internal micro-controller for controlling said portable HDD duplicator to perform read and write operations to access said source HDD and said multiplicity of target HDDs and ascertain HDD information and parameters therefrom;

d. providing direct data path between said source HDD and said multiplicity of target HDDs;

e. providing a source HDD data bus switch and control signal switch, and a multiplicity of target HDD data bus switches and control signal switches, controlling the switches to operate said direct data path between said source HDD and said multiplicity of target HDDs such that the copied data directly flows from said source HDD to said multiplicity of target HDDs without utilizing any memory buffer;

f. performing read and write operations to duplicate data directly from said source HDD to said multiplicity of target HDDs simultaneously, where reading data from said source HDD is performed at the same time as writing data to said multiplicity of target HDDs; and g. comparing data read from said source HDD with data read from said multiplicity of target HDDs which has already been written to said multiplicity of target HDDs.

49. The method as defined in claim 48 further comprising the step of providing power to said source HDD and said multiplicity of target HDDs.

50. The method as defined in claim 48 further comprising the step of monitoring the operation of said portable HDD duplicator.

51. The method as defined in claim 48 further comprising the step of providing code memory to said micro-controller.

52. The method as defined in claim 48 further comprising the step of providing a support circuit interconnecting to said micro-controller.

53. A method of using a portable hard disk drive (HDD) duplicator for simultaneously duplicating data from a source HDD to at least one target HDD, comprising the steps of:

a. connecting said portable HDD duplicator to said source HDD;

b. connecting said portable HDD duplicator to said at least one target HDD;

c. performing read and write operations to access said source HDD and said at least one target HDD and ascertain HDD information and parameters therefrom;

d. utilizing an internal micro-controller for controlling said portable HDD duplicator to perform read and write operations to access said source HDD and said at least one target HDD and ascertain HDD information and parameters therefrom;

e. providing direct data path between said source HDD and said at least one target HDD;

f. providing a source HDD data bus switch and control signal switch, and at least one target HDD data bus switch and control signal switch, controlling the switches to operate said direct data path between said source HDD and said at least one target HDD such that the copied data directly flows from said source HDD to said at least one target HDD without utilizing any memory buffer; and g. performing read and write operations to duplicate data directly from said source HDD to said at least one target HDD where reading data from said source HDD is performed at the same time as writing data to said at least one target HDD.

54. The method as defined in claim 53 further comprising the step of providing power to said source HDD and said multiplicity of target HDDs.

55. The method as defined in claim 53 further comprising the step of monitoring the operation of said portable HDD duplicator.

56. The method as defined in claim 53 further comprising the step of comparing data read from said source HDD with data read from said at least one target HDD which has already been written to said at least one target HDD.

57. A method of using a portable hard disk drive (HDD) duplicator for simultaneously duplicating data from a source HDD to at least one target HDD, comprising the steps of:

a. connecting said portable HDD duplicator to said source HDD;

b. connecting said portable HDD duplicator to said at least one target HDD;

c. providing direct data path between said source HDD and said at least one target HDD; and d. utilizing an internal means for controlling said portable HDD duplicator to perform read and write operations to access said source HDD and said at least one target HDD and ascertain HDD information and parameters therefrom;

e. providing a source HDD data bus switch and control signal switch, and at least one target HDD data bus switch and control signal switch, controlling the switches to operate said direct data path between said source HDD and said at least one target HDD such that the copied data directly flows from said source HDD to said at least one target HDD without utilizing any memory buffer; and f. performing read and write operations to duplicate data directly from said source HDD to said at least one target HDD.

58. The method as defined in claim 57 further comprising the step of comparing data read from said source HDD with data read from said at least one target HDD which has already been written to said at least one target HDD.

* * * * *